(12) United States Patent
Albazz et al.

(10) Patent No.: US 7,778,883 B2
(45) Date of Patent: Aug. 17, 2010

(54) METHOD, SYSTEM, AND COMPUTER PROGRAM PRODUCT FOR MANAGING AN ELECTRONIC CONTRACT

(75) Inventors: Imaddin Othman Albazz, Markham (CA); Lev Mirlas, Thornhill (CA)

(73) Assignee: International Business Machines Corporation, Armonk, NY (US)

( * ) Notice: Subject to any disclaimer, the term of this patent is extended or adjusted under 35 U.S.C. 154(b) by 1092 days.

(21) Appl. No.: 11/425,471

(22) Filed: Jun. 21, 2006

(65) Prior Publication Data
US 2006/0235794 A1      Oct. 19, 2006

Related U.S. Application Data

(63) Continuation of application No. 09/972,435, filed on Oct. 5, 2001, now abandoned.

(30) Foreign Application Priority Data
Oct. 6, 2000    (CA)  .................................... 2322601

(51) Int. Cl.
   *G06Q 30/00*    (2006.01)
(52) U.S. Cl. ................... 705/26; 705/1; 705/27
(58) Field of Classification Search ............ 705/1, 705/26, 27
   See application file for complete search history.

(56) References Cited

U.S. PATENT DOCUMENTS

| | | | |
|---|---|---|---|
| 5,446,653 A * | 8/1995 | Miller et al. .................... | 705/4 |
| 5,949,876 A | 9/1999 | Ginter et al. | |
| 6,067,531 A * | 5/2000 | Hoyt et al. ..................... | 705/35 |
| 6,141,653 A * | 10/2000 | Conklin et al. ................ | 705/80 |
| 6,167,383 A | 12/2000 | Henson | |

(Continued)

OTHER PUBLICATIONS

"Signaling Intentions and Obliging Behavior Online: An Application of Semiotic and Legal Modeling in E-Commerce" James Backhouse; Edward K. Cheng. Journal of End User Computing: Apr.-Jun. 2000. Retrieved via ProQuest Mar. 27, 2010.*

(Continued)

*Primary Examiner*—Jeffrey A. Smith
*Assistant Examiner*—Michael Misiaszek
(74) *Attorney, Agent, or Firm*—Jeanine S. Ray-Yarletts

(57) ABSTRACT

A system and method for generating a filtered product list from a master product list, and for electronically facilitating subsequent contractual activities executed pursuant to a contract. The contract comprises a Business Rules Book containing a set of rules from which specific rules may be selected for inclusion in the contract. A Terms and Conditions Set representing a unique set of instances of rules selected from the Business Rules Book is selected from a plurality of stored Terms and Conditions Sets. The seller and the buyer settle the provisions of the contract by agreeing to a mutually acceptable set of Terms and Conditions. The administering organization creates a Product List Filter specific to each seller or buyer, targeting products in which there is a mutual interest. The Business Rules Book, Terms and Conditions and Product List Filter are linked in a contract profile, to create a contract representing the agreement between the seller and the buyer, and the contract is locked. The Product List Filter allows the product list visible to the buyer or seller to be altered unilaterally by the administering organization, by modifications to the master product list.

3 Claims, 10 Drawing Sheets

U.S. PATENT DOCUMENTS

| | | | | |
|---|---|---|---|---|
| 6,236,984 | B1 * | 5/2001 | Owens et al. | 1/1 |
| 6,338,050 | B1 * | 1/2002 | Conklin et al. | 705/80 |
| 6,519,627 | B1 * | 2/2003 | Dan et al. | 709/203 |
| 6,850,900 | B1 * | 2/2005 | Hare et al. | 705/26 |
| 6,873,992 | B1 * | 3/2005 | Thomas | 1/1 |
| 7,080,076 | B1 * | 7/2006 | Williamson et al. | 1/1 |
| 7,222,109 | B1 * | 5/2007 | Flanagan et al. | 705/80 |
| 2002/0046099 | A1 * | 4/2002 | Frengut et al. | 705/14 |
| 2003/0046186 | A1 * | 3/2003 | Wren | 705/27 |

OTHER PUBLICATIONS

"Click on the Dotted Line: New legislation linking legal documents and the Internet may bring trouble for consumers" Eric Herman. New York Daily News. New York, N.Y.: Jul. 2, 2000. Retrieved via ProQuest on Mar. 27, 2010.*

* cited by examiner

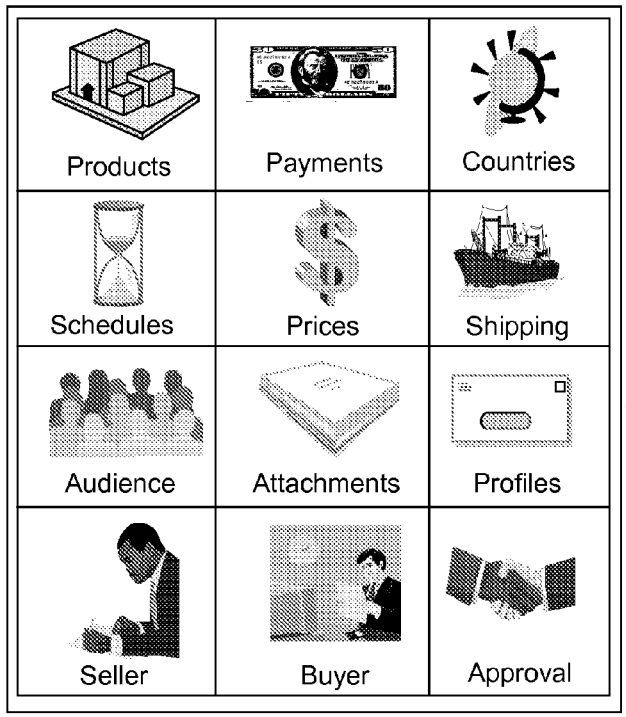
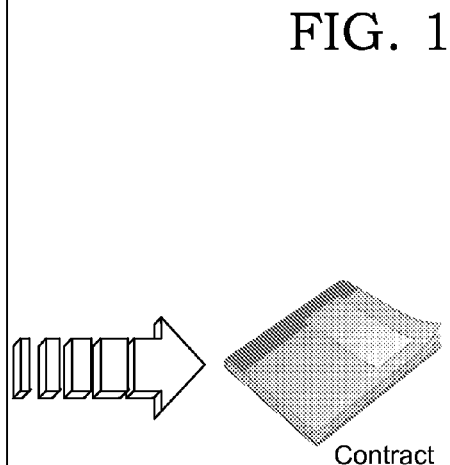
FIG. 1
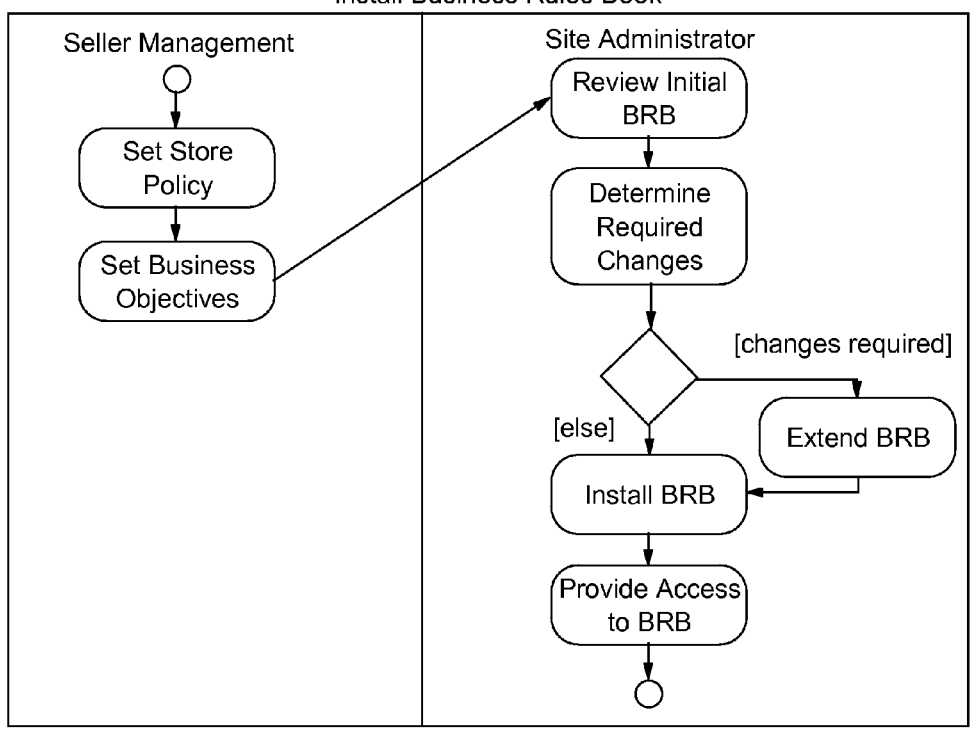
FIG. 2

Linking Multi-Fold Ts&Cs Pages to PLF

Contract Negotiation Subsystem

Update Contract

Contract-Centric B2B E-Commerce System

Contract-Centric B2B Procurement System

METHOD, SYSTEM, AND COMPUTER PROGRAM PRODUCT FOR MANAGING AN ELECTRONIC CONTRACT

CROSS-REFERENCE TO RELATED APPLICATION

The current application is a continuation of the co-owned, U.S. Utility application Ser. No. 09/972,435, titled "System and Method for Generating a Filtered Product List from a Master Product List in a Contract", and filed on Oct. 5, 2001 now abandoned, which is hereby incorporated herein by reference.

FIELD OF INVENTION

This invention relates to document generation, workflow control and electronic commerce. In particular, this invention relates to a system and method for generating a filtered product list from a master product list in a contract, and for carrying out contractual activities between contracting parties within parameters set by the contract.

BACKGROUND OF THE INVENTION

The commercial contract has evolved as a means of developing an ongoing business trust and loyalty between trading parties. A contract is a document that expresses an agreement between trading partners for the execution of contractual activities. Most often the contractual activities will be commercial in nature, however a contract can also be used to govern the conduct of parties in non-commercial activities. The contract becomes the parties' reference in the execution of such activities, as well as legal evidence of the intention of the parties which governs any dispute regarding the activities.

Today, with trading and partnership taking place over widely dispersed geographical regions among parties that may never have met, the contract has become the cornerstone for closing and executing a buyer-seller business relationship. Business-to-consumer trading tends to involve single impulse transactions, supported either by implied contractual terms or by involved contract documentation setting out terms that have been essentially fixed by the seller. On the other hand, business-to-business (B2B) commerce, defined herein as using electronic interactions to conduct business among enterprises, is more likely to take the form of an ongoing partnership, with repeated transactions that may be of a varying character. Business-to-business commerce thus requires greater flexibility in the generation and execution of the contract governing the parties' ongoing business relationship.

In business-to-business trading the buyer can range from a small, home-based business to a large multi-national corporation dealing with retailers, manufactures, suppliers and other trading partners. However, common to all business-to-business trading is a contract negotiation and preparation cycle: the parties to a prospective commercial relationship interact in a dialog which culminates in an agreement for a one-time deal or an ongoing buyer-seller commitment, and subsequently one or more contractual activities take place within the framework of the agreement reached between the parties. The contractual activities are governed by the contract, a legally binding document that describes the parties' business relationship and the terms and conditions governing each activity. Even when trading over an electronic marketplace, buyers and sellers are bound indirectly by the contract administered and controlled by the marketplace owner. Contracts can be simple and straight forward, or very elaborate with a complicated set of business rules and many involved parties, depending upon many factors including the size and scope of the arrangement, legal regulations relevant to the contemplated activities, the industry involved, and so on.

Electronic commerce presents its own unique problems. Traders who are moving toward conducting commerce over the Internet, typically by either establishing a self-managed or hosted e-commerce "store" and following a one-to-one contract negotiation process, or by participating in a third party-managed "marketplace", face four main problems from the perspective of negotiation and execution of the contract:

1. How to prepare and publish a business contract over the Internet—Conventionally traders have used text editors, copiers, facsimile transmission and mail to exchange contract drafts in a two-way dialog. More recently e-mail over the Internet has become a popular medium for exchanging unclassified contract drafts. However, none of these methods optimally delivers the required productivity, flexibility or control needed for an efficient electronic commerce contract-generating process.

2. How to collaboratively negotiate and approve a contract—Trading partners usually go through a contract negotiation process that can involve many individuals from different divisions within one or both traders. Contracts are normally created using standard templates and attachments or by modifying an existing contract from a previous similar arrangement. The selling organization always has the objective of reducing the contract preparation and negotiation cycles, however even with today's communication advances, this process may still take many months and can lead to business losses if deadlines are missed. This exposure is more dramatic in an accelerating e-commerce business-to-business market, where a wasted day can mean millions of dollars in lost revenues, or losing a deal to a competitor.

Two elements of the contract are primarily responsible for prolonging the contract negotiation cycle. First is the bilateral agreement on the deliverables, whether products or services. Second are the terms and conditions of the arrangement. Prices and discounts are typical examples of terms and conditions, since they reflect what the buyer will pay and what the seller will receive when contractual activities are executed under the agreement. However, there are many other factors in the terms and conditions which can in some situations have an equally significant impact, such as delivery arrangements, billing and payment terms and after sale services, for example.

At the end of the contract preparation and negotiation cycle, each party physically signs and seals the contract, and conducts contractual activities under the contract with reference to a stored copy.

3. How to integrate the contractual terms and conditions into an overall e-commerce solution used by the buyer and seller to execute contractual activities under the contract once the contract is signed—In most traditional solutions, an administrator feeds one or more back-end applications with parameters manually extracted from a printed copy of the signed contract. This can work effectively if the seller's marketing and sales divisions follow some rigid set of rules during the contract negotiation phase, but in most cases this does not happen and the seller organization ends up with a contract that does not fit precisely within the predefined back-end system parameters. In other words, the contract, or at least some terms and conditions in the contract, must be executed and controlled manually.

This can present significant administrative problems for a seller organization executing activities under hundreds of business contracts, each with unique terms and conditions, or in a marketplace used by thousands of interacting buyers and sellers, for example where the marketplace does not offer enough contractual flexibility to match the sales division creativity or cope with document formatting details required by the buyers' accounts payable staff.

Existing automated contract generation systems are of limited assistance, because they tend to consist of pre-written terms and conditions embedded directly into the contract document. This limits the flexibility of the contract and requires a skilled programmer to make revisions, taking control out of the hands of a properly trained contract administrator. Further, the automation ends with the closing (i.e. signing) of the contract document, so most of the administration and management of subsequent activities under the contract, including ensuring conformity with the terms of the contract, must be implemented manually.

4. How to bridge the process and policy "gap" with other trading partners—Business enterprises have developed their own methods of achieving their business goals, even within a particular region or industry. They have created processes and implemented manual systems and computer systems to achieve these goals. As these systems were evolving, enterprises encoded them with bits and pieces of their business "rules", used to determine the processes implemented by that particular system and control their workflow. As a result, most business enterprises have scattered or fragmented business policy rules implemented in more than one computer or system, which are connected electronically, or more frequently manually, to achieve the overall enterprise process workflow. Changing an enterprise practice or policy thus often requires amending many application systems, and hence disturbing the workflow balance.

On the other hand, conducting electronic trading with another enterprise, either directly or through an e-marketplace, requires sharing and integrating business processes from both sides. It also entails sharing some policy rules and data to change or control the process workflow at the trading partner's side. Since such information neither originates from nor targets one central system, more integration points and cumbersome technological methods are required to achieve an effective enterprise-to-enterprise business processes molding.

SUMMARY OF THE INVENTION

The invention overcomes these disadvantages by providing a system and method for automating the contract negotiation and preparation cycle, and for electronically facilitating subsequent contractual activities executed pursuant to the contract. According to the invention, a system for generating a contract between a seller and a buyer comprises a Business Rules Book (BRB) maintained by an administering organization, for example the seller, containing a set of rules from which specific rules may be selected for inclusion in the contract. The seller selects a Terms and Conditions Set from a plurality of stored Terms and Conditions Sets, each representing a unique set of Instances of rules selected from the Business Rules Book. The seller and the buyer settle the provisions of the contract by agreeing to a mutually acceptable Terms and Conditions Set.

In the preferred embodiment the buyer conveys product needs to the seller, from which the seller creates a Product List Filter specific to the buyer that targets only those products in which the buyer has expressed an interest. The Business Rules Book, Terms and Conditions Set and Product List Filter are linked in a contract profile, to create a contract representing the agreement between the seller and the buyer, and the contract is locked to prevent unilateral amendment by either party.

In a buy-side embodiment, where the buyer is the administering organization, the buyer selects a Terms and Conditions Set from a plurality of stored sets of Terms and Conditions Sets, for example in a tender for bidding by suppliers. The buyer can create a Product List Filter specific to each seller that targets only those products which the seller will be engaged to supply. When an agreement is reached the elements of the contract are linked and locked as described above.

In the preferred embodiment, subsequent contractual activities under the contract are executed through the contract as a conduit, which automatically inserts values from the parameters in the contract. Thus, absolute conformity with the terms of the contract is maintained for each activity executed under the contract, and manual administrative activities are minimized.

The contract preparation and negotiation system and method according to the invention takes advantage of the wide reach of the Internet to automate contract creation and accelerate the contract negotiation cycle. A contract created according to the invention gives trading organizations a well defined and shared entity to control and monitor their business relationship. The Business Rules Book, Terms and Conditions and Product List Filters are flexible and extendible, offering selling and buying organizations considerable versatility, improving the efficiency of the contract negotiation process, and, unlike other automated contract generation systems, allowing contract revision and upgrading to be managed by an administrator rather than a computer programmer, and also allowing a business person, rather than a computer programmer, to drive business policy.

The execution aspect of the invention reduces buyer and seller administrative overhead and reduces overall transaction cost. The system and method of the invention accordingly allow for a one-to-one marketing and business relationship with unlimited number of trading organizations. The Business Rules Book can potentially form the central repository and enterprise governor for all industry- or business-specific rules and practices. In the preferred embodiments the invention offers granular components that can be easily customized to support different business models or workflows, and allows flexible access control of the generated entities, such as Terms and Conditions and Product List Filters.

The system and method of the invention de-fragments and centrally stores all of a business enterprise's rules, policies and procedures, which facilitates the implementation of changes within an organization and enhances the efficiency of integration of two or more trading enterprises into a business arrangement. The system and method according to the invention also provides means for facilitating a management control chain through the hierarchy of business personnel, allowing each level of personnel to deal with enhancement to and modification of systems within their respective core competency, while limiting access at each level to the responsible personnel.

The present invention thus provides a system for generating a filtered product list from a master product list, comprising a computer for: implementing a selection metaphor to generate representation criteria comprising products selection criteria or products exclusion criteria, or both, storing the representation criteria, and generating the filtered product list from the representation criteria.

The present invention further provides a method of generating a filtered product list from a master product list, comprising the steps of: a. implementing a selection metaphor to generate representation criteria comprising products selection criteria or products exclusion criteria, or both, b. storing the representation criteria, and c. generating the filtered product list from the representation criteria.

The present invention further provides a computer program product for use with a computer, the computer program product comprising a computer usable medium having computer readable program code means embodied in said medium for generating a filtered product list from a master product list, said computer program product having a. computer readable program code means for implementing a selection metaphor to generate representation criteria comprising products selection criteria or products exclusion criteria, or both, b. computer readable program code means for storing the representation criteria, and c. computer readable program code means for generating the filtered product list from the representation criteria.

In further aspects of the invention: the filtered product list is generated for a party to a contract by a product list filter linked to the contract; the product list comprises a product list identifier; the product list identifier is associated with at least one target buyer or seller; in response to a request to view a product list from a target buyer or seller, the computer communicates the filtered product list associated with the target buyer or seller issuing the request; the filtered product list comprises a plurality of product list tiers, each tier comprising a subset of products contained in the filtered product list and being associated with a tier identifier; and/or in response to a request to view a product list tier from a target buyer or seller, the computer communicates the product list tier associated with the tier identifier referenced in the request.

BRIEF DESCRIPTION OF THE DRAWINGS

In drawings which illustrate by way of example only a preferred embodiment of the invention, FIG. 1 is a diagrammatic representation of the basic elements of a commercial contract, FIG. 2 is an activity diagram showing the creation and installation of a Business Rules Book in a seller organization.

DETAILED DESCRIPTION OF THE INVENTION

Figure 3:
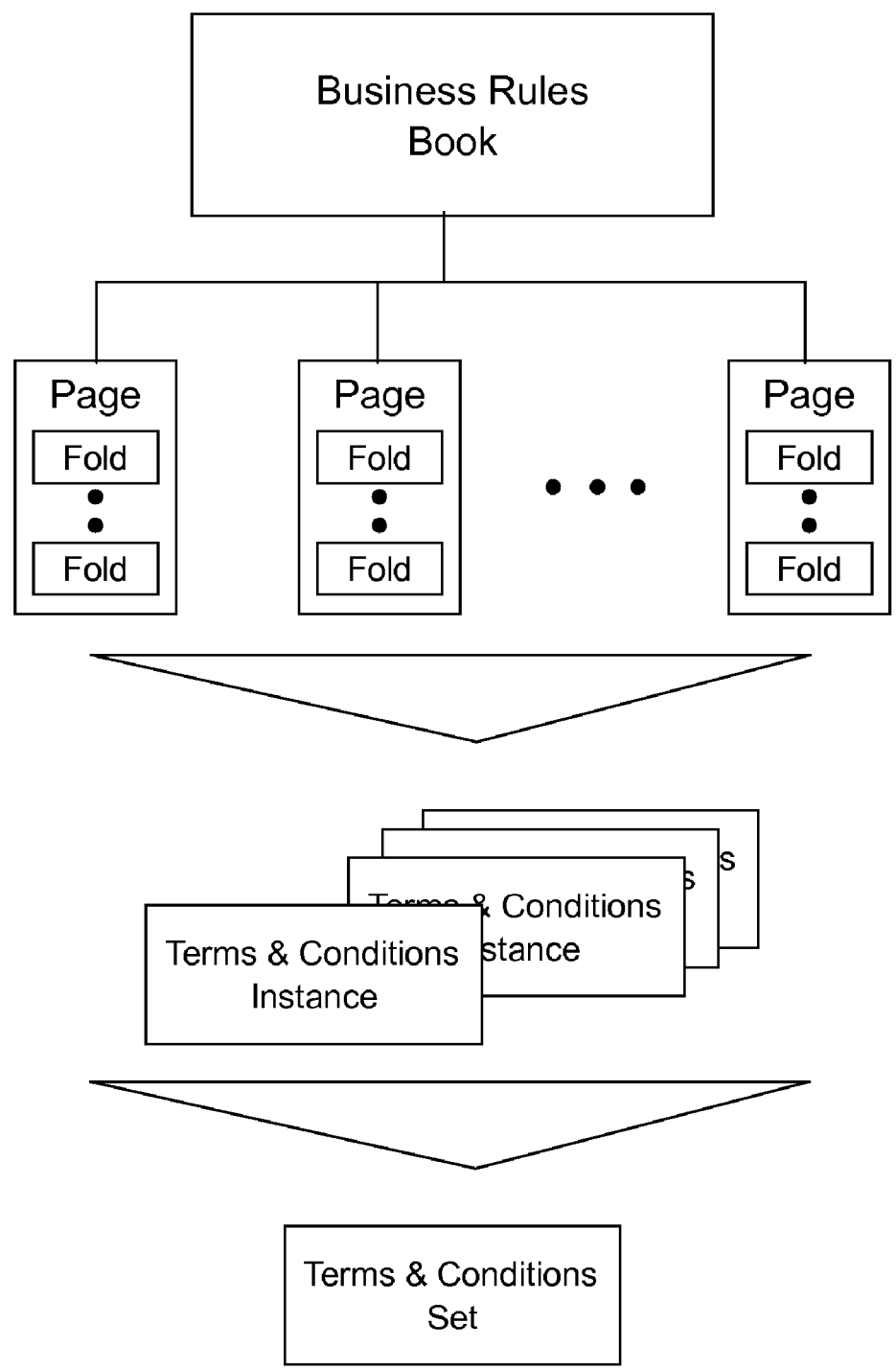
FIG. 3 is a diagrammatic representation of the relationship between the Business Rules Book and the Terms and Conditions Sets.

The invention provides a system and method for automating the contract negotiation and preparation process, and for executing contractual activities under the concluded contract. FIG. 1 illustrates the main components or information elements constituting a business contract, which are as follows: A seller profile; a buyer profile; unstructured text attachments (commitments, disclaimers, statement of work, penalties, etc.); traded goods (e.g. a list of products or services); prices, incentives, payments and other financial terms and conditions; delivery mechanisms and schedules; audience (beneficiaries, implementers, auditors, signatories, witnesses, etc.); contract term and territories; signatures and approvals; and contract presentation format, i.e. how the above elements are organized and represented in a contract. In FIG. 1 these elements are organized in an order and format which isolates negotiable and non-negotiable elements of the contract.

Non-negotiable elements include the lower six blocks in the diagram, which represent names, profiles, audience, approvals, and any standard contractual text. All other elements are classified as negotiable elements. All non-negotiable elements can be easily collected and managed over an Internet (preferably World Wide Web) based collaborative environment maintained by the seller organization that offers two main features:

1. Data entry and update web pages for collecting and maintaining trading partner profiles and any other information pertaining to personnel or resources that need to be referenced in a contract; and 2. A non-structured text editor which supports HTML or a like format, preferably XML/XSL, and preferably also supports document versions.

Negotiable elements can be further sub classified into Static Elements and Dynamic Elements. The contract-generating aspect of the invention addresses the challenges introduced by Static Elements and Dynamic Elements in a commercial contract.

A Static Element is an element that, once agreed to between the negotiating parties, is unlikely change during the life of the contract. Any subsequent change to a Static Element by mutual agreement between the parties would require amendment of the contract or a new contract, in either case with an appropriate re-signing procedure.

A Dynamic Element is an element that will inevitably change during the term of the contract, for example the seller's product lists which may change with the addition of new products, the discontinuation of old products, or simply the revision of product descriptions. Product prices are also likely to be Dynamic Elements in any contract operating over a lengthy term, as the trading parties are unlikely to commit to fixed prices over an extended interval. Dynamic Elements can represent a serious challenge in the negotiation and administration of a long term contract.

The system and method of the invention extends through the contract preparation, negotiation and closing (locking) phases of the contract. The invention also provides a system and method for contract-centric execution of contractual activities under the contract, according to which activities executed under the contract are conducted through the contract as a processing entity, to reduce the manual administrative burden and ensure compliance with contractual terms, as is discussed in greater detail below.

Generation of the Contract

The preferred embodiment of the invention provides a Business Rules Book, Terms and Conditions Instances, Product List Filters and Linking Contract Elements, all of which are integrated to facilitate the contract preparation and negotiation cycle.

The Business Rules Book (BRB) is an entity which resides on the administrator organization (seller, buyer, market owner/host or other administrator organization) electronic commerce system. The BRB is compilation of business rules which is preferably a centrally-stored codification of all business policies, industry practices, and the scope and characteristics of the selling organization business offerings. The BRB is preferably invisible to users from the buyer organization, and even to users inside the seller organization who do not have a business justification to work on BRB. In a marketplace environment, the BRB is owned and administered by the marketplace owner, who will make it accessible to all participating buyers and suppliers. FIG. 2 illustrates an example of the creation and installation of a Business Rules Book in a seller organization, by way of example, according to the invention.

The Business Rules Book contains any desired number of "Pages", which are preferably logically organized into business disciplines that are sensible within the context of the implemented e-commerce store or marketplace business and industry. For example, separate Pages could be provided for contract-specific elements such as pricing and discounts, order fulfillment, billing practices, invoice layout, payment schedules etc., along with Pages defining industry-specific elements such as group insurance policies, regulatory practices etc. A Page can be further divided into a plurality of "Folds", by which each Fold inherits the main characteristics of the Page but can also hold its own specific set of parameters. Pages can also be grouped together in an aggregate Page.

Each BRB Page and Fold thus holds a predefined set of parameters, which in the case of a Page represent the full spectrum or range of options offered by the seller in the category to which the Page is directed, and in the case of a Fold may represent a defined subset of the parameters contained in the Page. Each parameter is linked to a corresponding linking program which executes the required business logic to implement the rules contained within the respective Page or Fold. Linking programs can be written in any language, however rules engines are preferred for their flexibility and ease of use.

An administrator organization requires only one BRB to implement and run a business-to-business e-commerce site or electronic marketplace. Once the BRB is in place, it becomes the central source or reference template for all allowed and supported practices within the seller or marketplace organization. The BRB is customizable and can be updated and/or extended by the administrator organization. While BRB changes would not be expected to be a daily operation practice, since no business would ordinarily change their business practices that frequently, the BRB offers sufficient flexibility for the administrator organization to amend business rules and introduce new business rules in response to market changes and buyer demands. This is done either by updating specific pages or by inserting new pages to the BRB. New pages can be developed either in-house or by a solution provider, and in the preferred embodiment are implemented only by management personnel having access to a BRB modification interface.

From a software developer or seller perspective, the BRB can be designed with a certain industry focus in mind. For example, a BRB can be specific to the health care industry, government, manufacturing or any other industry vertical.

The BRB is used in conjunction with Terms & Conditions Instances. Each Terms & Conditions (Ts&Cs) Instance represents a set of specific Instances of Pages in the Business Rules Book. The Ts&Cs Instances are created by the administering organization, which in the case of a seller may involve personnel from the seller's sales and marketing division, for example a sales or business development administrator. Like the BRB, the Terms and Conditions Instances can also be considered to consist of Pages. Each Page of the Ts&Cs Instances corresponds to a Page in the Business Rules Book, and provides the appropriate execution parameters for the BRB Page logic. For example, if the BRB page contains logic to determine a discounted price, the corresponding Ts&Cs Instance in the Ts&Cs Set would set the discount percentage.

Figure 4:
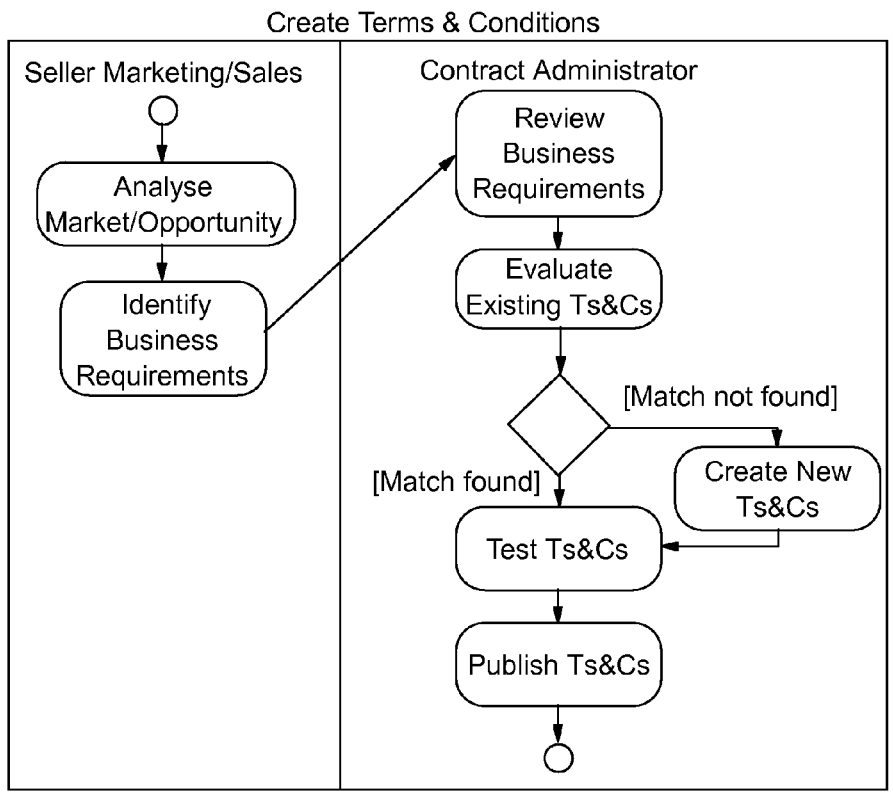
FIG. 4 is an activity diagram showing the creation and publication of a Terms and Conditions Set in a seller organization.

The Ts&Cs Instances thus combine to generate a specific Ts&Cs Set within the parameters established by the BRB, which is deemed to be attractive to a buyer and acceptable to the seller. FIG. 3 illustrates the hierarchical relationship between the Ts&Cs Set and the BRB. FIG. 4 illustrates an example of the creation and publication of a Ts&Cs Instances.

An enterprise implementing a business-to-business e-commerce site or marketplace needs at least one Ts&Cs Set to create contracts. However, in order to give more choices to the sales team, the preferred embodiment of the invention provides for the creation of many different Ts&Cs Sets using the Business Rules Book. Each Ts&Cs Set represents an integrated set of terms and conditions which can be used selectively by the sales group to prepare and propose contracts to prospective buyer organizations. In a marketplace, different Ts&Cs Sets created by a supplier can be used by the e-commerce site to respond to a request for quotation (RFQ) from a buyer either by automatic rating and matching of the request or by pre-assigning a Ts&Cs Set to the buyer. Set In the preferred embodiment each Ts&Cs Set contains the following information: Ts&Cs identifier or reference number; Ts&Cs short description; Ts&Cs Status (Active, Published, Restricted, Test, Expired); links to applicable non-structured text attachments, like special conditions or disclaimers; dates for Ts&Cs creation, start, expiry; and Pages designed for the targeted store business and industry.

The following (non-limiting) examples of Ts&Cs Instances illustrate how the Ts&Cs Set can play a focal role in a business-to-business e-commerce site:

Pricing: Applicable pricing model, e.g. Fixed, Auctions, RFQ (useful for supporting a multi-pricing contract with a mix of fixed- and dynamic-priced products); applicable % discount by each category; applicable bottom line discount; price uplift % (applicable to all items); minimum monetary amount for a single transaction (for % discount eligibility); maximum monetary amount for the contract; exit to user-defined pricing rule, defined using a built-in rule engine;

Fulfillment Options, such as: Split orders policy (splitting rules, allow partial fulfillment, allow back order creation), aggregation policy, maximum aggregation delay, back order policy, maximum waiting period of back order; order substitution policy (substituting out-of-stock item by another item with equivalent features and/or price);

Monetary amount toleration: Acceptable tolerance level in a difference between a PO and corresponding delivery notice and invoice, rounding-off rules (especially useful in multi-currency transactions);

Retention periods, for purchase requests, purchase orders, receipts, and invoices;

Customer care: Product return and replacement policy; warranty; service level agreement;

Billing Arrangements: Frequency, cost centers, etc.;

Payment Options: P-cards, checks, etc.;

Shipping Arrangements: Frequency, courier, packaging, etc.;

Formatting pages, to provide flexibility in: Purchase order numbering; invoice numbering; contract layout (formatting, page size, etc.); invoice layout or p-card statement level; purchase order layout; delivery notice layout; transmission media (softcopy, printed copies, etc.); electronic transmission protocols;

Set Each Terms and Conditions Set created from the Business Rules Book and Terms and Conditions Instances is an entity independent of a contract, so the same terms and conditions may be reused in contracts for different buyers by implementing the same Ts&Cs Set. Pages and Folds within the Terms and Conditions Instances reflect a balance of available terms and conditions as delimited by the BRB, which are selected by the sales group and ideally ratified by management.

During the contract negotiation process the seller may decide to switch into a more attractive Ts&Cs Set, to overcome buyer reluctance or a competitive offer and win the buyer's business. This is readily done by simply referencing a different Ts&Cs Set identifier or reference number in the proposed contract or in response to an RFQ. Once a contract is approved and signed by the buyer, a copy of the selected Ts&Cs Set becomes an integral part of that contract. A contract may only include one Ts&Cs Set.

Similarly, in a marketplace a supplier may decide to implement a competitive Ts&Cs Set and dedicate that Set for RFQs received from a certain buyer. Other Ts&Cs Sets can be automatically interchanged by the e-commerce system depending, for example, on the value or the product items in a received RFQ.

In the preferred embodiment, when a new Ts&Cs Set is first created by an administrator it is assigned a 'Test' status and becomes accessible only to the creator and other personnel at the administrator organization having the required system access privileges, to allow for proper verification (and optionally management approval) of the new Ts&Cs Set, for example as to pricing, invoicing format etc., before implementation. Once testing is over and the new Ts&Cs Set has received any required approvals, the status of the Ts&Cs Set is changed to 'Active' and the Ts&Cs Set can be published by the administrator for inclusion in new contract proposals.

Active Ts&Cs Sets can be reused as desired to create multiple contract proposals. Ts&Cs Sets may optionally be restricted by the administrator organization to a certain buyer or to a group of buyers. They may also be restricted by product(s), business volume, value or any other desired categorization. These features are especially useful in a marketplace implementation.

In a self-administered or hosted e-commerce store, access control may optionally be introduced to restrict the accessibility to and use of Ts&Cs Instances and/or Sets. This restriction will likely be required in a marketplace implementation, for example where the seller site is potentially viewed by many different buyer organizations, each with a different set of terms and conditions. The following are some (non-limiting) examples of access control policies which may be enforced according to the invention:

Ts&Cs Instances and/or Ts&Cs Sets may be restricted by the seller to a certain buyer or to a group of buyers;

Ts&Cs Instances and/or Ts&Cs Sets may be restricted by business volume or value, e.g. they may only be used for arrangements having annual revenues exceeding a selected amount;

Ts&Cs Instances and/or Ts&Cs Sets may be linked to one or more Product List Filters, as described below.

Figure 5:
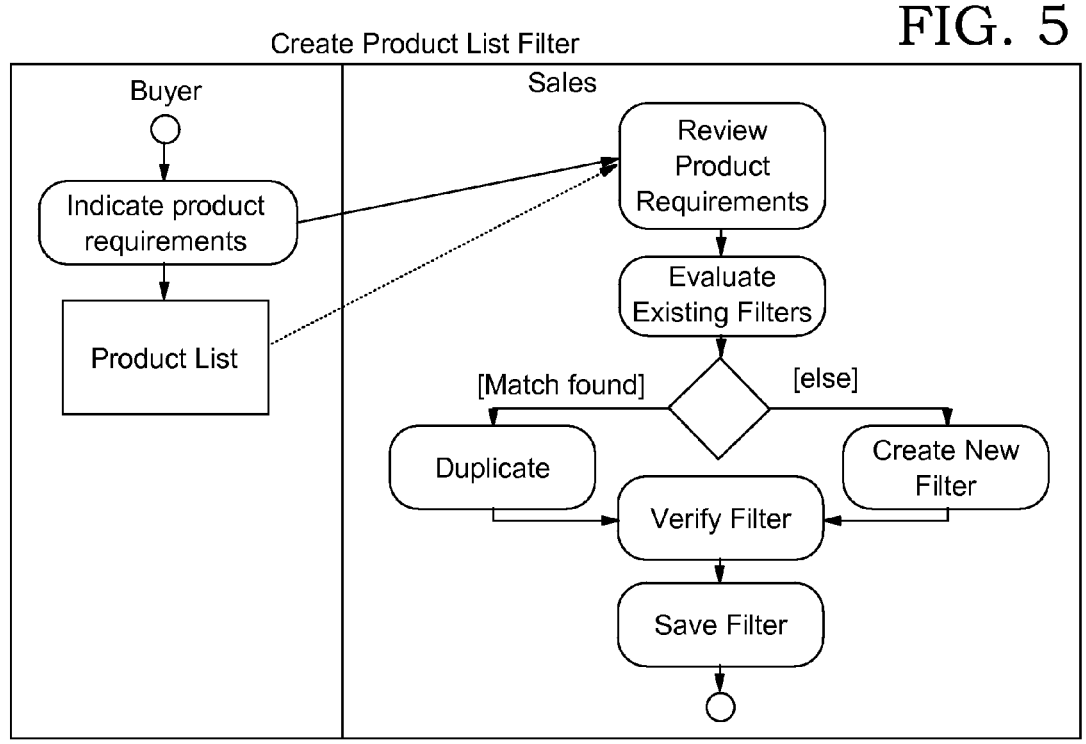
FIG. 5 is an activity diagram showing the creation and storage of a Product List Filter.

A Product List Filter (PLF) is a representation of a seller's product list which replaces the complete list of all products available from a seller organization (as used herein the term "products" includes both products and services). This representation comprises products selection and/or exclusion criteria, based on a selection metaphor. The representation criteria are structured and stored in a way that ensures rebuilding the targeted product list from a master product catalog, or from multiple catalogs or other product information sources, any time the target product list is required. Depending upon the used PLF, a generated list could be static with the same products being produced at every run, or could be dynamic with new products being added or removed according to changes taking place at the seller organization. FIG. 5 illustrates an example of the creation and storage of a Product List Filter.

Different tools can be adapted to create Product List Filters, for example commercially available tools commonly known as configurators, however the configurator should be capable of saving and reusing a created PLF. The PLF is stored under a unique identifier or reference number, and becomes the products element representation in a contract. The PLF can thus be considered to be an extension of the Terms and Conditions Instances, in the sense that it is an instance (an agreed to subset of products) which governs the scope of products to which the other terms and conditions of the contract apply. However, the PLF is advantageously constituted as a separate entity because it will typically advantageously be a Dynamic Element, and also because it serves as a useful tool for targeted marketing and other communications to the buyer.

A PLF can be extended into multi-tier configuration where each tier holds a logical division of the targeted product set domain. Each tier of a multi-tier PLF has its own sub-identification, which is hierarchically linked to the main PLF identification. When a PLF is referenced, all products from the related tiers within that PLF are included. However, when a tier sub-identification is referenced, products from other tiers in the same PLF are excluded.

PLFs can be implemented within the contract preparation and negotiation cycles in different scenarios. For example, a seller may define a product list to be offered to a particular buyer and create a specific PLF for that list, which is used by the contract preparation administrator to prepare the contract. In another example, seller and buyer representatives negotiate and agree on a targeted list of products, which is then reverse engineered by the seller to create a PLF. In each case, once a product list (which may be framed more broadly as a list of product categories) is agreed to and approved it will be defined by a corresponding PLF which becomes an integrated component of the contract. This eliminates the need to include an actual product list in the contract, and offers the flexibility required to generate a dynamic product list that can be refreshed with new products whenever the seller decides that such new products should be made available.

A seller can define one or more PLFs that can be linked to offered Ts&Cs Sets or restricted to certain buyers, thus controlling the content of the product list on a buyer-specific basis. The specified buyer(s) become a target buyer for the filtered product list, and PLFs enforce the products viewable by any particular buyer in the execution aspect of the invention, discussed below, whenever the buyer accesses the seller's e-commerce site (store or marketplace). The buyer can then select or search for required products from the filtered version of the seller's master product list.

Figure 6:
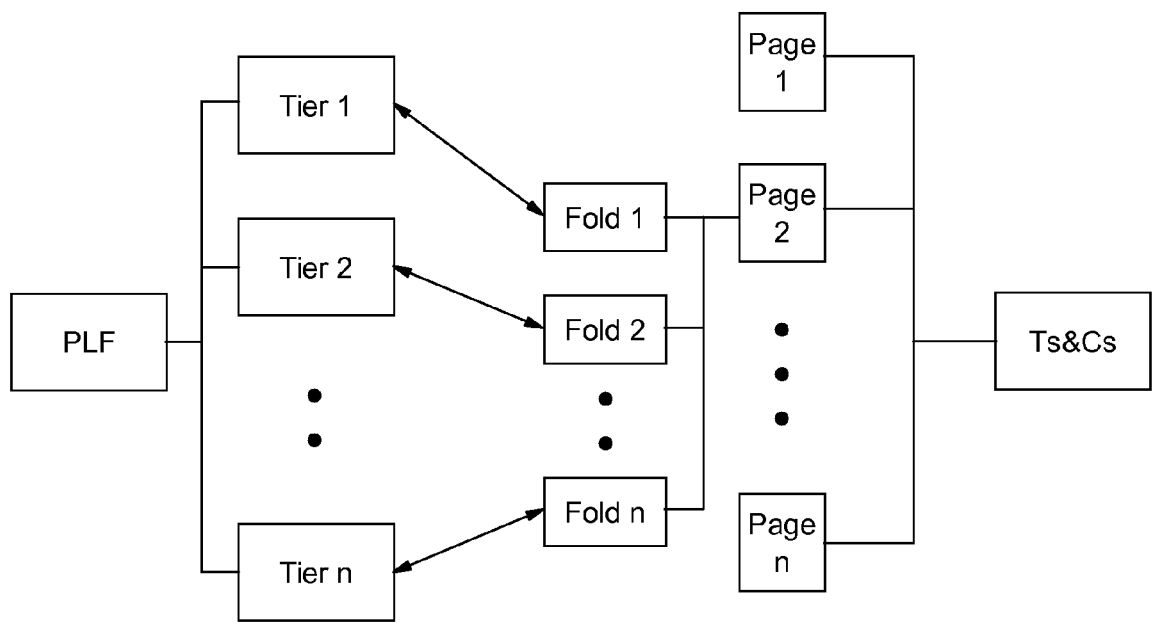
FIG. 6 is a diagrammatic illustration of a manner of linking a multi-fold page of Terms and Conditions Set to a multi-tier Product List Filter.

All contract Static Elements and Dynamic Elements are tied together in a contract profile, which includes linking the Product List Filter(s) and any Dynamic Elements in the Terms and Conditions Set. FIG. 6 illustrates an example of linking a Ts&Cs Page having a multiple Folds to a multiple-tier PLF. Other scenarios might involve linking Ts&Cs Page Folds to other contract elements, for example to different divisions of a buyer organization.

When a negotiated contract is approved by both the seller and buyer the Contract Profile, including non-negotiable elements, Ts&Cs and PLFs, is locked to prevent any accidental or deliberate change to the contract elements. According to the preferred embodiment of the invention, the contract then becomes the core of all contractual activities executed pursuant to the contract.

Figure 11:
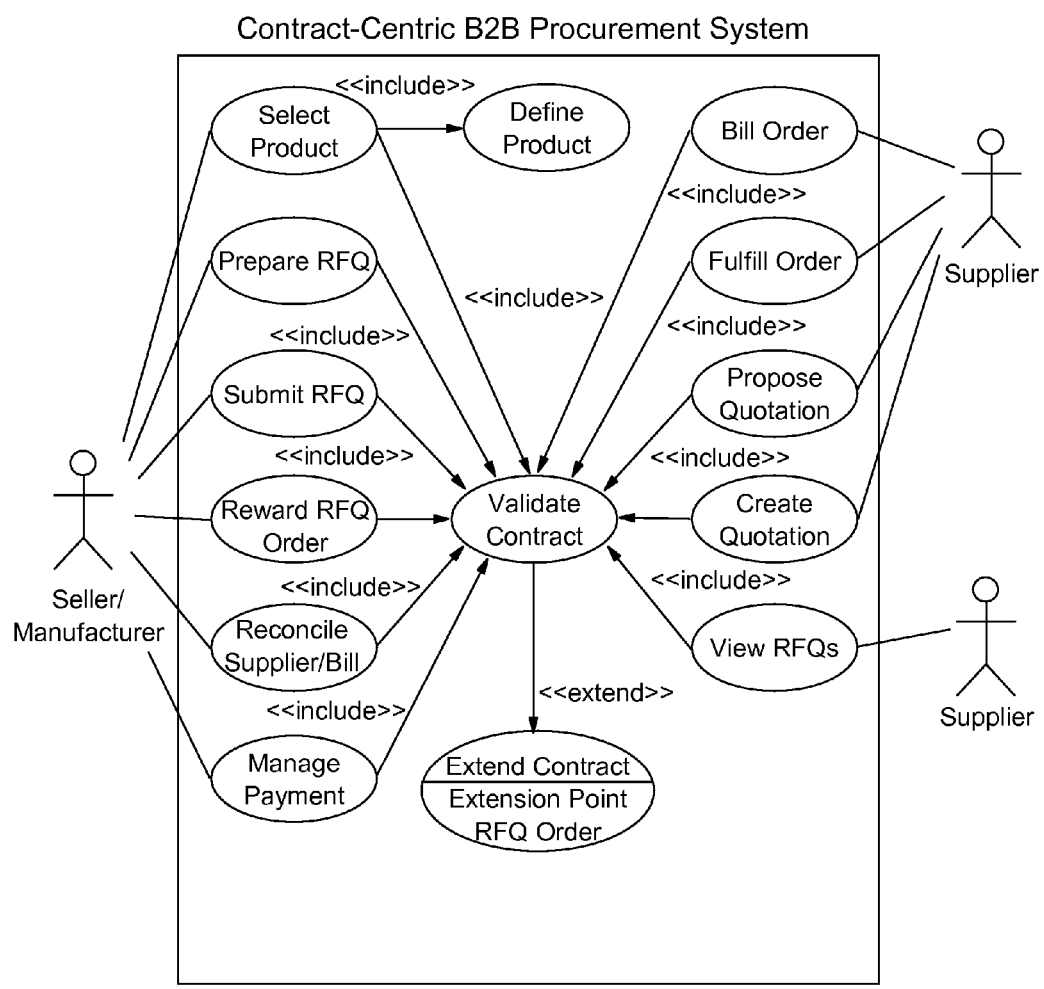
FIG. 11 shows a use cases example of a buyer-based purchasing transaction involving a group of potential suppliers.

The system and method of the invention can equally be implemented in a buyer-based contract negotiation and preparation cycle. The use cases diagram of FIG. 11 illustrates an example of business-to-business implementation in which the buyer, shown in FIG. 11 as a manufacturer (but may also be a distributor or any other buyer role), is purchasing direct or indirect material from a seller, shown in FIG. 11 as a group of potential suppliers. In this case the buyer implements and administers a Business Rules Book with associated sets of Terms and Conditions Instances, specifying the volumes required, prices the buyer is willing to pay, delivery schedules, payment terms etc.

In the buy-side embodiment, the buyer can create a Product List Filter specific to each seller which targets only those products which the seller will be engaged to supply. When an agreement is reached the elements of the contract are linked and locked as described above. The buyer may develop and implement any number of Product List Filters for product purchases, drawing from a list of supplies required by the buyer, with each PLF designed to be visible only to suppliers relevant to each particular product or product category.

Execution of Contractual Activities Under the Contract

When trading parties have approved a contract, the elements are linked, sealed and saved at the seller's e-commerce site (store or marketplace). Authorized buyer and seller personnel can view the contract. However, changes to any negotiable Static Element, Ts&Cs Set or PLF in an approved contract requires the trading parties' re-approval. Changes to the contents of a Dynamic Element, for example where updates are made by the seller to the master product catalog contents which include product categories within a PLF, do not require the buyer's approval since the impact of these changes is shielded by the PLF and such changes are contemplated by the contract.

When activated by the contract administrator, an approved contract becomes the central business control component in the execution aspect of the system and method of the invention. All other integrated processes reference the contract and related subsystems whenever a buyer-seller transaction is initiated. In effect, the contract becomes a processing entity through which contractual activities executed under the contract are routed, as illustrated in FIG. 10.

Figure 10:
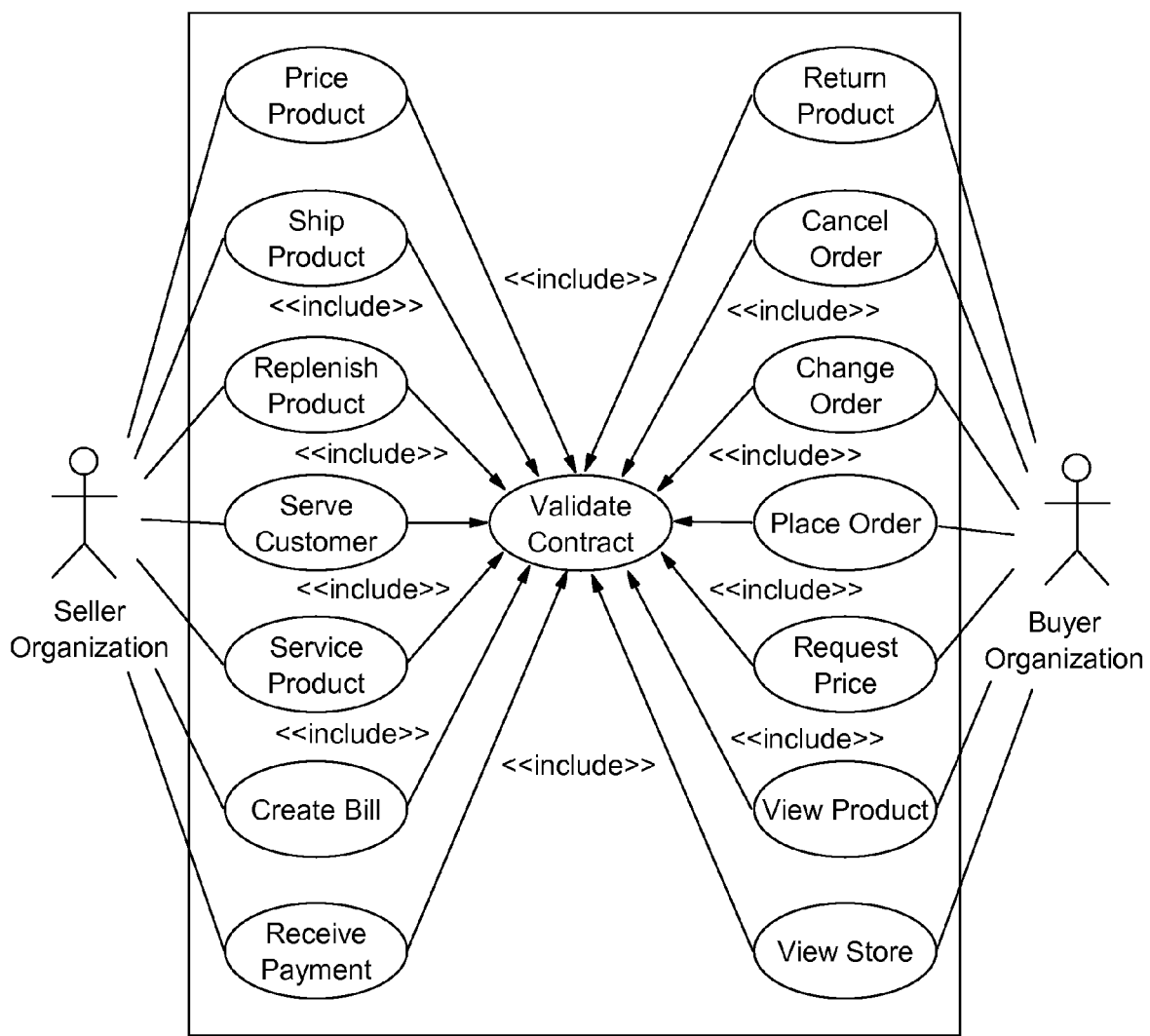
FIG. 10 shows a use cases example of a sell-side e-commerce transaction.

It will be appreciated that the contract can play this central role in any e-commerce implementation model, most advantageously in a business-to-business context, and the invention is not limited to the sell-side model illustrated in FIG. 10. Different implementation models such as marketplace scenarios or buy-side procurement, as shown in FIG. 11, may introduce new parties and workflows, but the contract elements and its central governing role remain equally applicable.

The contract Ts&Cs Set and Product List Filter are used by the seller's e-commerce site to determine the contents, prices, process flow, and 'look and feel' of the business-to-business store or marketplace from the buyer perspective. The seller maintains one copy of a master product catalog, or a group of catalogs, and by using different Ts&Cs Sets combined with buyer-selected Product List Filters, the seller can create unlimited one-to-one customized store or marketplace user interfaces for each different buyer organization.

Moreover, for each contractual activity executed under the contract, the terms of the activity are imported into transaction documentation from the contract itself, thus avoiding both the administrative burden of ensuring compliance with the contract and the interposition of human error or oversights which may occur through manual administration. In each transaction, business forms in a format previously agreed to between the parties are generated automatically from the contract elements. Dynamic Elements such as the PLF are maintained fully up to date by virtue of the seller's background maintenance and updating of catalogs and other product information, and all instances of the BRB specific to the particular buyer are incorporated into the transaction documentation without manual intervention.

To implement the system of the invention the seller organization creates a BRB, which may be prepared by the seller in-house or refined from templates or precedents provided by an e-commerce solution provider and supplied to the seller. Once approved the BRB, containing all management approved policies and practices, is published by the seller and installed on the seller's e-commerce site by the e-commerce solution provider or a site administrator.

Using the BRB as a guide, the seller's contract administration staff, with the necessary direction from marketing, finance and any other involved divisions, creates test Ts&Cs Sets for approval by management, and ultimately publishes a collection of approved Ts&Cs Sets each specifying respective sets of Ts&Cs Instances representing specific Instances of the negotiable elements from the seller organization's BRB. The seller also compiles a product catalog, or a group of catalogs or other product information sources, featuring the complete list of products to be made available to prospect buyers, preferably identifying one or more product categories for each product.

During negotiation of the contract with a prospective buyer, the seller's administration personnel prepare the required extraneous contractual text elements, including prospect buyer organization profile. The seller's sales personnel create a Product List Filter, optionally with multiple tiers, based on discussions with the prospect buyer, and supply seller administration staff with the PLF reference number. Sales personnel select an appropriate Ts&Cs Set from the organization's published collection and advise the administration staff with the chosen Ts&Cs Set reference. If it is determined that none of the existing Ts&Cs is attractive enough or consistent with the prospect buyer's particular requirements, for example in pricing or fulfillment areas, sales personnel may initiate the creation of a new Ts&Cs Set for management approval, which could be restricted to that particular business arrangement or published for subsequent use with other prospect buyers. If it is determined that the existing BRB is not flexible enough to generate an attractive Ts&Cs Set, management can initiate the process of adding new pages to the BRB or extending or amending existing BRB Pages (the Ts&Cs Set, being a set of specific terms and conditions from within the range permitted by the BRB, cannot offer terms or conditions outside the scope of the BRB).

Figure 7:
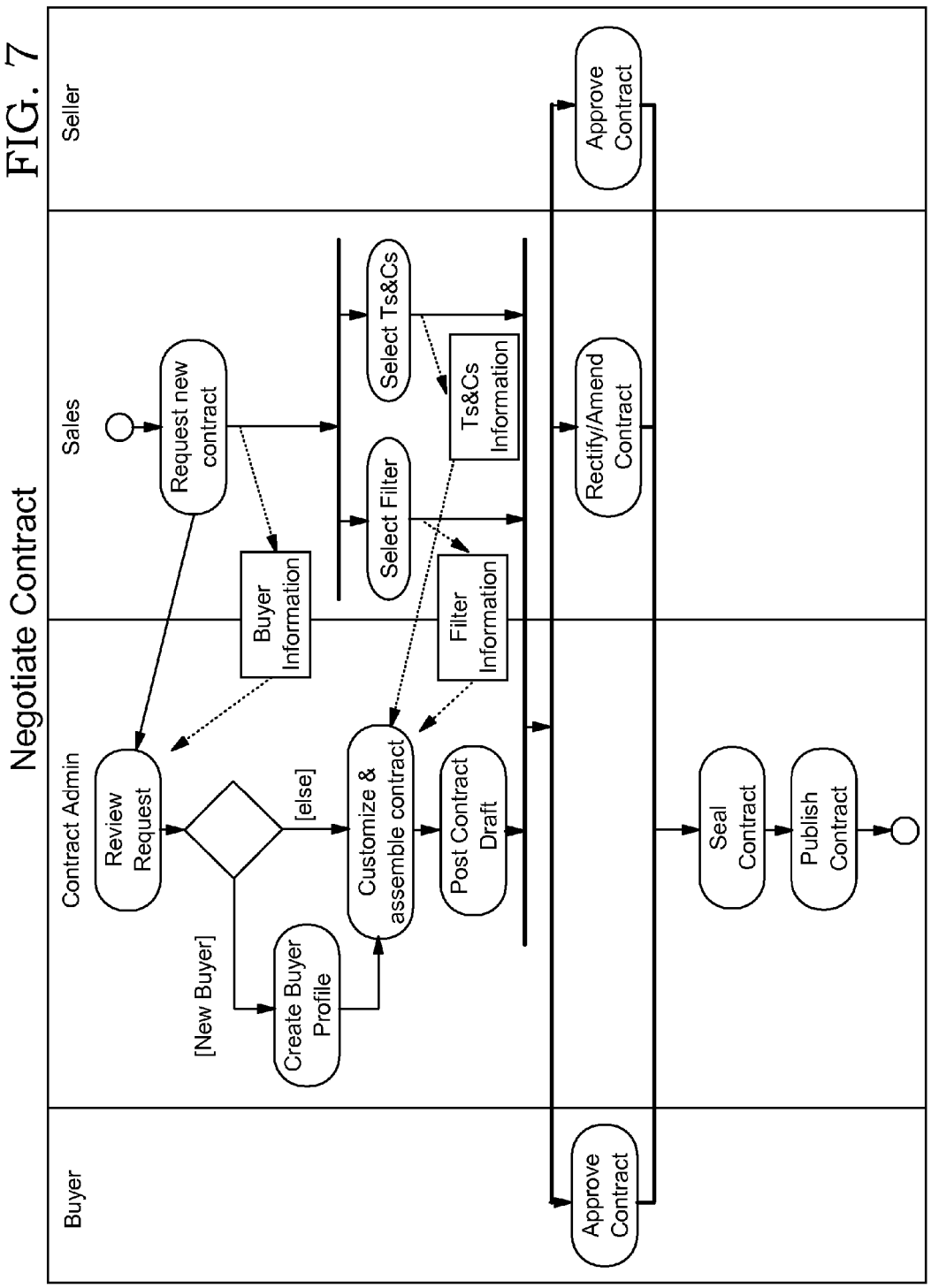
FIG. 7 is an activity diagram showing the negotiation and preparation of a contract created according to the invention.
Figure 8:
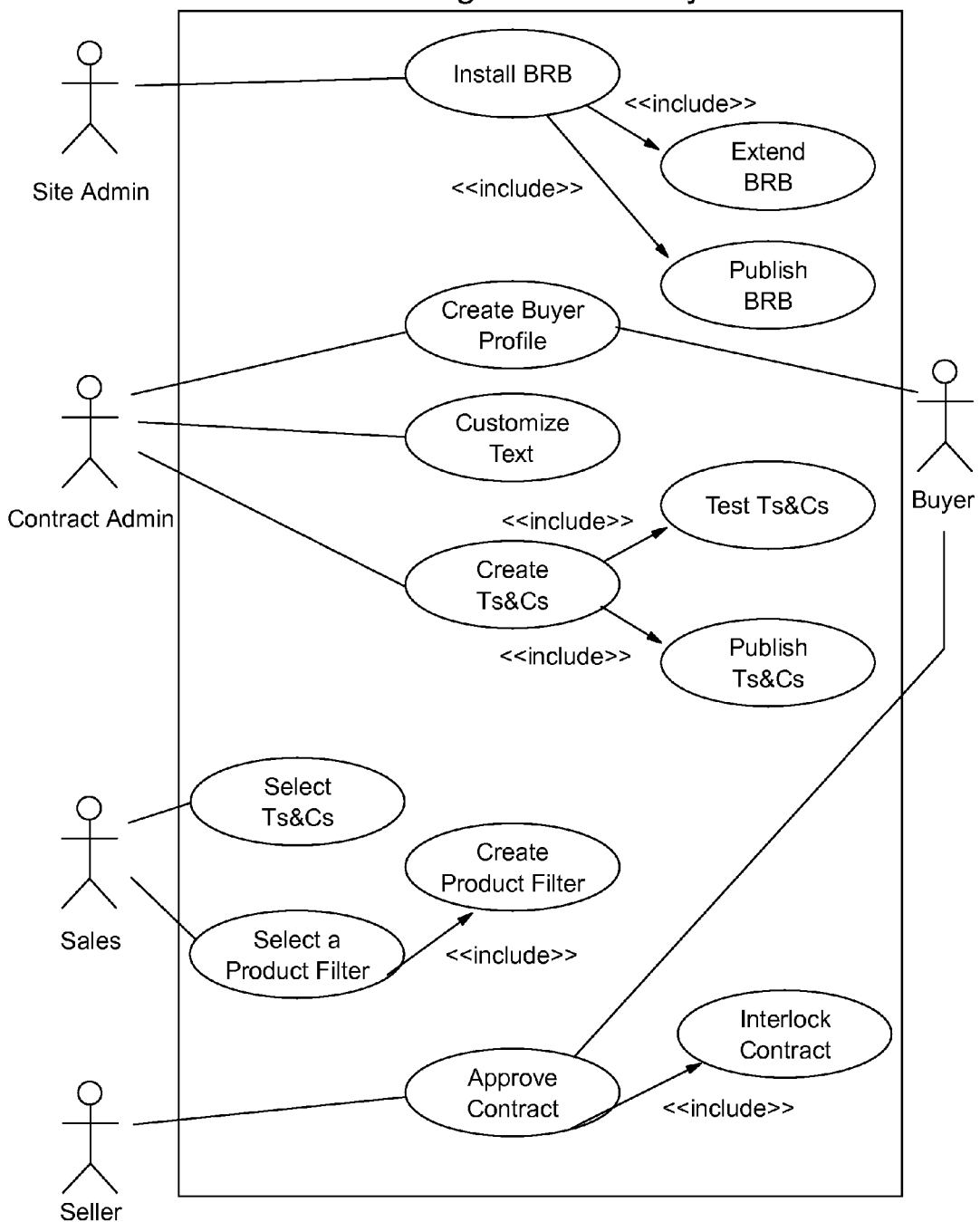
FIG. 8 shows a use cases example of a contract negotiation subsystem according to the invention.

The seller's administration personnel use the PLF and Ts&Cs Set reference information to prepare and publish a complete contract proposal. The proposed contract is presented to the prospect buyer through a secure Internet (preferably World Wide Web) connection, preferably through a site designed specifically for contract negotiation, to the decision making team at the buyer organization. The buyer and seller negotiating teams collaborate over the secure site to amend and update negotiable contract elements. FIGS. 7 and 8 illustrate examples of the negotiation and preparation of a contract thus generated according to the invention.

Figure 9:
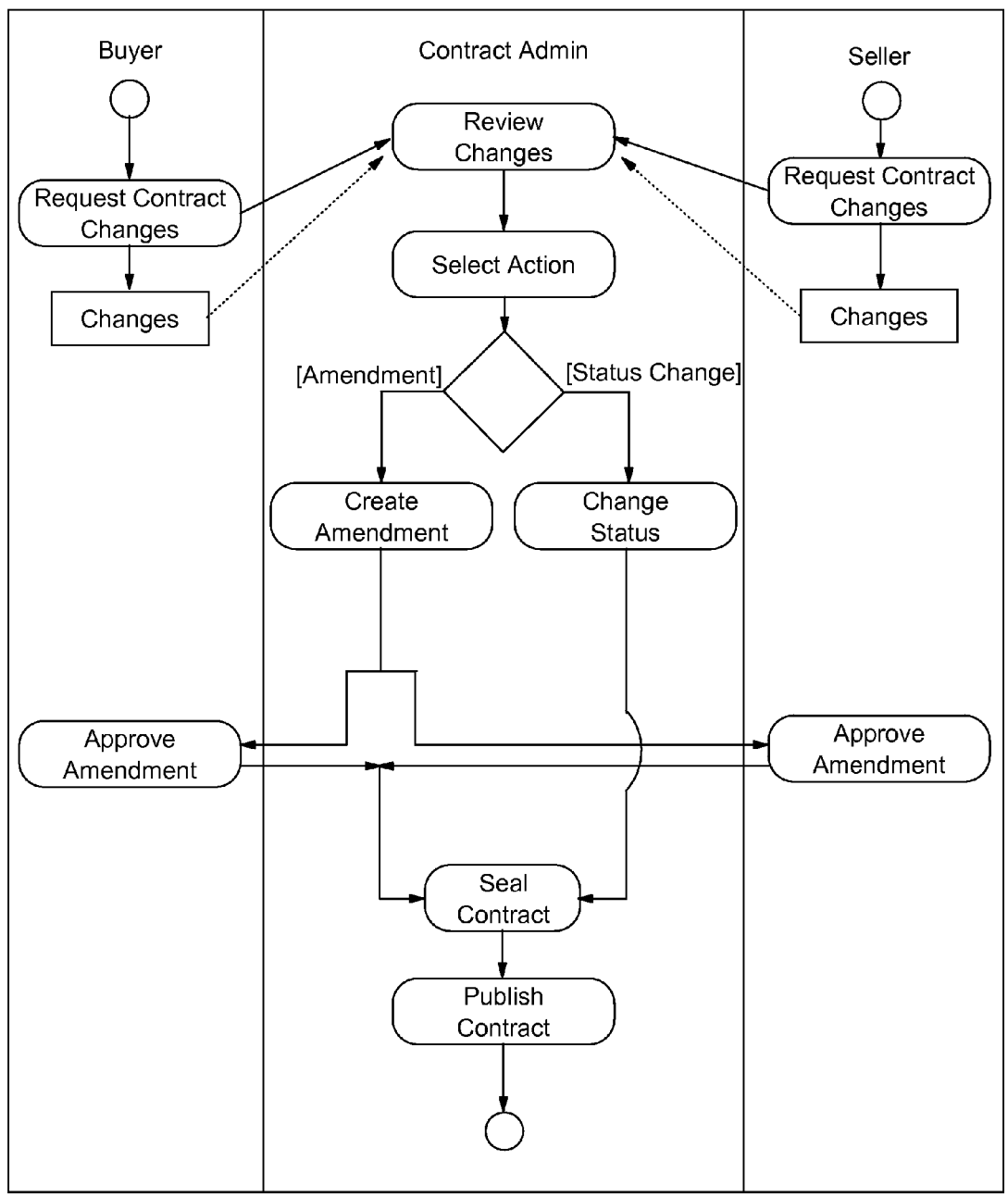
FIG. 9 is an activity diagram showing the modification of a contract negotiated according to the invention.

When final revisions of all contract elements are approved by negotiating parties, all elements are interlocked by the seller contract administration staff to prevent further changes to the contract, as shown in FIG. 8. The contract is locked, for example using conventional digital signature techniques or otherwise, to lock all contract elements including the designated Ts&Cs Set and the Product List Filter, and is registered by the seller's administrator as a signed contract. Thereafter, the Static Elements of the contract may be amended only by mutual agreement between the parties, in the manner illustrated in FIG. 9.

Signed contracts are either automatically activated by the system upon interlocking of contract elements, or manually published (i.e. set to an 'Active' state by the administrator). Active contracts are exposed to other e-commerce subsystems, such as order management, fulfillment, billing and payment, services, etc. The contract PLF determines which products from the seller's master product list sources are made visible to buyer personnel for processing under the contract. Similarly, the contract Ts&Cs Instances determines the prices which are viewed by buyer personnel and, when the buyer submits a requisition, how these requisitions are fulfilled and which prices should appear in the invoice. FIGS. 10 and 11 respectively illustrate use cases examples of a sell-side e-commerce transaction, and a buyer-based purchasing transaction involving a group of potential suppliers as seller and a manufacturer as buyer.

Figure 12:
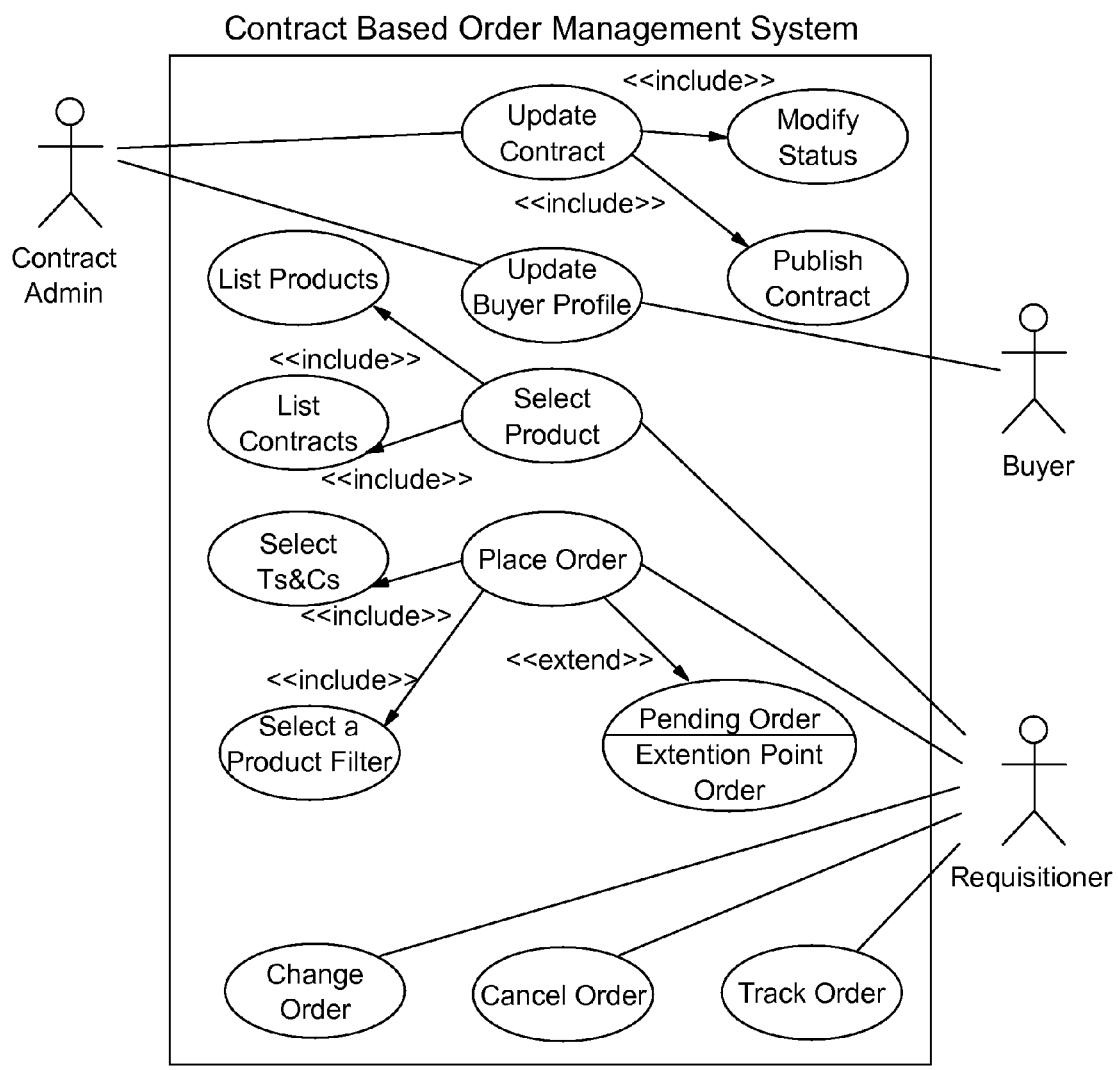
FIG. 12 shows a use cases example of a contract-centric order process.

The contract continues to govern the e-commerce business transaction processes between the seller and the buyer until expiry of the contract term. A contract can be terminated by the seller, by the buyer, or by mutual agreement, according to the terms of the contract. A contract may also terminate when a specific condition from the Ts&Cs Set is met, for example when the maximum monetary amount is reached or when stipulated products are fully delivered. A sample contract-centric order process showing the execution of a contractual activity under a contract is illustrated in the use cases diagram of FIG. 12, which includes a seller-initiated contract activation use case and shows the activities of a requisitioner (e.g. a purchaser) within the buyer organization.

It can be seen that the system and method of the invention can also be applied in a business-to-consumer environment. Ordinarily the terms of the contract would be fixed by the seller or other administering organization, which would select a suitable Ts&Cs Set to be used for all consumer contracts, without a negotiation phase. However, the linking of the Business Rules Book, Ts&Cs Set and PLF, as well as the execution of contractual activities through the contract, occurs in the same fashion as that described above in the business-to-business environment.

In a further embodiment the system and method of the invention also accommodate auctions, marketplace exchanges and special offers. To introduce an auction or a special bid offering to a business-to-business store or marketplace, a buyer or a supplier may:

Create a Product List Filter for the promoted special, auctioned or required products;
Create and test a special Ts&Cs Set to specify the auction or bid type and applicable pricing and fulfillment terms;
Activate the special Ts&Cs Set to make it accessible by the targeted buyers or suppliers; and
Publish the special Ts&Cs Set and notify targeted buyers or suppliers.

The system and method according to the invention thus provide means for facilitating a management control chain, through the hierarchies established by the BRB and BRB Pages/Folds, Ts&Cs Sets and Ts&Cs Instances, PLFs and PLF Tiers. This allows businesses to maintain control over the content of contracts through the hierarchy of their personnel. For example, in a sell-side contractual negotiation seller executives can determine the basic rules for the BRB, while marketing managers can control the implementation of Ts&Cs Instances and sales personnel can select appropriate Ts&Cs Sets for each prospect or customer. Access privileges to the various contract elements can be restricted (as to visibility, use/and or modification) according to the level of personnel responsible for each respective element. Similarly, different departments within a buyer organization may have access to different tiers of a PLF, or different Ts&Cs Sets. This enables a business to operate efficiently, consistently, and within the boundaries accorded to each level of the organization.

The system and method of the invention also improve the control of processes workflow within an enterprise and between trading partners, through interaction between the BRB and Ts&Cs Instances. Rules can be invoked by the BRB according to Ts&Cs parameters and/or the step reached in a workflow process (for example as determined by the occurrence of a prior event), and Ts&Cs Instances can thus direct workflow processes differently in the case of contracts which embody different Ts&Cs Sets.

Preferred embodiments of the invention having been described by way of example only, it will be appreciated that various modifications and adaptations of the invention may be made without departing from the scope of the invention, as set out in the appended claims.

What is claimed is:

1. A method of managing an electronic contract, the method comprising:
  managing a set of business rules, the managing including logically organizing the set of business rules into a plurality of business disciplines;
  obtaining a plurality of terms and conditions sets, each terms and conditions set comprising a unique set of instances of business rules selected from the set of business rules;
  selecting one of the plurality of terms and conditions sets for the electronic contract;
  generating using at least one computing device a product list filter for the electronic contract, wherein the product list filter includes at least one representation criterion for generating a set of products for the electronic contract, the generating including:
    obtaining product needs for a buyer;
    identifying a set of desired products from a set of available products for a seller based on the product needs; and
    generating the product list filter based on the identified set of desired products, wherein the product list filter includes at least one of: a product selection criterion or a product exclusion criterion;

storing the selected terms and conditions set and the product list filter as a contract profile for the electronic contract;

locking the contract profile to prevent unilateral amendment of the electronic contract, wherein at least one of the selected terms and conditions set and the product list filter defines a dynamic element for the contract, wherein the dynamic element is allowed to change after the contract profile is locked;

obtaining a set of non-negotiable elements for the electronic contract;

creating the electronic contract based on the contract profile and the set of non-negotiable elements, the creating including:

generating a contract proposal based on the contract profile;

providing the contract proposal to a party to the electronic contract; and generating the electronic contract based on the contract proposal and the set of non-negotiable elements.

2. A system for managing an electronic contract, the system including at least one computing device comprising:

a system configured to manage a set of business rules, the managing including logically organizing the set of business rules into a plurality of business disciplines;

a system configured to obtain a plurality of terms and conditions sets, each terms and conditions set comprising a unique set of instances of business rules selected from the set of business rules;

a system configured to select one of the plurality of terms and conditions sets for the electronic contract;

a system configured to generate a product list filter for the electronic contract, wherein the product list filter includes at least one representation criterion for generating a set of products for the electronic contract, the system configured to generate including:

a system configured to obtain product needs for a buyer;

a system configured to identify a set of desired products from a set of available products for a seller based on the product needs; and a system configured to generate the product list filter based on the identified set of desired products, wherein the product list filter includes at least one of: a product selection criterion or a product exclusion criterion;

a system configured to store the selected terms and conditions set and the product list filter as a contract profile for the electronic contract;

a system configured to lock the contract profile to prevent unilateral amendment of the electronic contract, wherein at least one of the selected terms and conditions set and the product list filter defines a dynamic element for the contract, wherein the dynamic element is allowed to change after the contract profile is locked;

a system configured to obtain a set of non-negotiable elements for the electronic contract;

a system configured to create the electronic contract based on the contract profile and the set of non-negotiable elements, the system configured to create including:

a system configured to generate a contract proposal based on the contract profile;

a system configured to provide the contract proposal to a party to the electronic contract; and a system configured to generate the electronic contract based on the contract proposal and the set of non-negotiable elements.

3. A computer program product for use with a computer, the computer program product comprising a tangible computer usable medium having computer readable program code stored on said medium for managing an electronic contract, said computer program product having computer readable program code for enabling the computer to implement a method comprising:

managing a set of business rules, the managing including logically organizing the set of business rules into a plurality of business disciplines;

obtaining a plurality of terms and conditions sets, each terms and conditions set comprising a unique set of instances of business rules selected from the set of business rules;

selecting one of the plurality of terms and conditions sets for the electronic contract;

generating a product list filter for the electronic contract, wherein the product list filter includes at least one representation criterion for generating a set of products for the electronic contract, the generating including:

obtaining product needs for a buyer;

identifying a set of desired products from a set of available products for a seller based on the product needs; and generating the product list filter based on the identified set of desired products, wherein the product list filter includes at least one of: a product selection criterion or a product exclusion criterion;

storing the selected terms and conditions set and the product list filter as a contract profile for the electronic contract;

locking the contract profile to prevent unilateral amendment of the electronic contract, wherein at least one of the selected terms and conditions set and the product list filter defines a dynamic element for the contract, wherein the dynamic element is allowed to change after the contract profile is locked;

obtaining a set of non-negotiable elements for the electronic contract;

creating the electronic contract based on the contract profile and the set of non-negotiable elements, the creating including:

generating a contract proposal based on the contract profile;

providing the contract proposal to a party to the electronic contract; and generating the electronic contract based on the contract proposal and the set of non-negotiable elements.

* * * * *